(12) United States Patent
Mrázek

(10) Patent No.: US 7,750,603 B2
(45) Date of Patent: Jul. 6, 2010

(54) METHOD OF REGENERATING LEAD BATTERY CELLS AND REGENERATIVE AGENT FOR PERFORMING OF THIS METHOD

(75) Inventor: Jan Mrázek, Cheb (CZ)

(73) Assignee: Akuros s.r.o., Bratislava (SK)

( * ) Notice: Subject to any disclaimer, the term of this patent is extended or adjusted under 35 U.S.C. 154(b) by 0 days.

(21) Appl. No.: 12/318,088

(22) Filed: Dec. 22, 2008

(65) Prior Publication Data
US 2009/0140695 A1 Jun. 4, 2009

Related U.S. Application Data

(63) Continuation of application No. 10/548,468, filed on Jan. 12, 2006, now abandoned.

(51) Int. Cl.
H02J 7/00 (2006.01)
H01G 9/02 (2006.01)

(52) U.S. Cl. ...................... 320/130; 252/62.2

(58) Field of Classification Search ........................ None
See application file for complete search history.

(56) References Cited

U.S. PATENT DOCUMENTS 5,874,184 A * 2/1999 Takeuchi et al. ............ 429/314
5,986,432 A * 11/1999 Berlureau et al. ........... 320/125
6,878,492 B2 * 4/2005 Takeuchi et al. ............ 429/317

FOREIGN PATENT DOCUMENTS

| CZ | 260591 | 6/1989 |
|---|---|---|
| CZ | 271813 | 9/1991 |
| CZ | 278416 | 5/1992 |
| CZ | 292524 | 2/2003 |
| JP | 58059567 | 8/1983 |

OTHER PUBLICATIONS

English Abstract of CS271813.
English Abstract of CZ278416.
English Abstract of CZ292524.
English Abstract of JP58059567.

* cited by examiner

Primary Examiner—Edward Tso
Assistant Examiner—Ramy Ramadan
(74) Attorney, Agent, or Firm—Dykema Gossett PLLC

(57) ABSTRACT

A regenerative agent for lead battery cells includes, for each liter of aqueous solution 40% of hydrogen peroxide, 1 ml to 70 ml of sulfuric acid with a density of 1 to 1.32 $g \cdot cm^{-3}$, 0.1 g to 10 g of saccharides in solids and/or aldehydes or their derivatives, 0.1 g to 10 g of sodium and/or potassium bicarbonate and/or at least one hydroxide from the group of alkali metal hydroxides in solids and 0.1 g to 20 g, with an advantage 0.5 g to 2 g, of bisodium dinaphthylmethane disulfonic acid salt. The regenerative agent can also contain 0.1 g to 10 g of peroxoborate an/or tetraborate and/or sodium pyrophosphate in solids.

5 Claims, No Drawings

METHOD OF REGENERATING LEAD BATTERY CELLS AND REGENERATIVE AGENT FOR PERFORMING OF THIS METHOD

TECHNICAL FIELD

The invention concerns the method of regenerating lead battery cells with sulfuric acid electrolytes during which the regenerative agent on the basis of aqueous hydrogen peroxide is added to the electrolyte. Then at least one cell or storage battery is charged and discharged in the regular manner.

The invention concerns also the regenerative agent for performing of this method of regenerating of the lead batteries, containing an electrolyte of an aqueous solution of hydrogen peroxide, saccharides and/or aldehydes or their derivatives. It also contains bicarbonates and/or hydroxides of alkaline metals or peroxoborate, tetraborate, sodium pyrophosphate.

BACKGROUND OF THE INVENTION

Familiar recharging methods include watching the voltage, current and temperature or impulse recharging and discharging methods or the regulation of the size of the recharging current. Thus in a certain manner maintaining or even improving the state of the capacity of the battery, or the speed it recharges, is resolved. These methods, however, can result in an increase of sediment in the battery after the fall-out of irreversible sulfatation as a result of the partial release of irreversible sulfatation from the walls of the electrodes which can even lead to a decrease in the life of the battery.

A number of inventions solve this problem.

The Czech Author's Certificate AO no. 250 340 solves the connection of a static source for the charging and discharging of a battery. The controlled charging and discharging of the battery is resolved by connecting a static source that contains protection, synchronization and anti-jamming, galvanic separation and voltage transfer, rectification, filtration, and contact reversal circuits, current sensors and a control unit circuit. The purpose of this connection is the possibility of the controlled charging and discharging of batteries, its disconnection by assessment of the end marks of charging or discharging, the possibility of influencing the charging characteristics with manual intervention and the contactless blocking of the source functions when incorrectly connected to the power supply or battery.

The Czech Author's Certificate AO no. 219 246 describes the connection for the recharging and pulse charging of batteries. The positive output terminal of the storage battery charger is connected to the inlet of the source of recharging impulses, whose outlet is connected to the positive input terminal of at least one storage battery.

The published Czech patent application no. PV 2001-1276 presents a method and connection for charging at least two connected cells and the batteries assembled from them with the charging proceeding in two consecutive phases. In the first phase the battery is charged by a constant current and this phase is ended at the moment the voltage of the batteries reaches a previously-chosen upper limit. During the course of the immediately-following second phase the flow of the charging current is interrupted for a period during which the voltage of the battery is decreased to a previously-chosen lower limit by internal discharging. Then the flow of the charging current of the battery is restored.

The published Czech patent application no. PV 3003-95 from a Swedish applicant describes the method and apparatus for charging lead batteries. Lead batteries are charged by repeatedly switching the unit for the recharging of the batteries on and off. For the charging of batteries the times of around one second for connecting and disconnecting is appropriate. In the case of maintaining the charge it is appropriate to charge the battery in pulses which are parts of the periods of supply voltage with intervals of about 10 seconds. The circuit is properly interrupted using a circuit breaker on the primary side of the transformer.

U.S. Pat. No. 6,100,667 establishes the minimization of the time of the charging cycle of the battery recharging system by maximizing the length of time for which this high constant charging current is applied to a dead battery. The control circuit can be controlled by a constant or variable internal reference voltage. If a variable internal reference voltage is used, the time of the charging cycle of the control circuit is further minimized by the compensatory technology of the charging current.

These aforementioned inventions document the current state of the technology in which various methods of charging and discharging lead and alkaline cells or batteries are utilized. The current worldwide state of recharging batteries is directed to the types of rechargers that control the charging current considering the internal resistance of the charged battery (a secondary source). With the gradual aging of a lead battery an irreversible sulfatation is created on its electrodes, which influences the value of the internal resistance of the charged battery leading to an error in the evaluation of the charging current when recharging. A battery recharged in this manner can then only attain values of partial charging which can result in its being damaged during operations if it is not secured against forbidden discharges.

Several additives solve another method of increasing the capacity of the cells or the batteries assembled from them, especially if lead or alkaline.

For example in Slovak patent no. 277 838 an additive in a powdered state which contains sodium peroxoborate, sodium pyrophosphate, glycides or their epimers is specified for lead batteries.

On the Czech market preparations under the brand names of AMPER PLUS, Supervit, Mečta, and others are well-known for the regeneration of lead batteries filled with sulfuric acid electrolytes. Due to their relatively small effectiveness, these preparations did not prove successful on the market and did not remain.

Preparations based on the basis of peroxidic compounds created by an aqueous solution of hydrogen peroxide brought significant advancements in this area. Regenerative agents of this type are specified in Czech inventions, i.e. in Czech Author's Certificates nos. AO 262274, AO 271813, AO 271814, AO 271768, AO 278416.

Czech Author's Certificates nos. 260 591 and 272 401 describe the lead and alkaline battery regeneration method using these regeneration additives.

Czech Author's Certificate no. AO 260 591 describes the method of regeneration of mechanically undamaged lead and alkaline battery cells. The regeneration is carried out by adding an aqueous solution of hydrogen peroxide in batches to the aqueous solution of the electrolyte, though it is suitable for the cell to be partially charged before regeneration and recharged in the process of regeneration.

Czech Author's Certificate no. AO 272401 presents a method of regenerating secondary cells of lead and alkaline storage batteries. The electrolyte in the cells is replaced by a regeneration solution containing hydrogen peroxide in a concentration of from 0.01% to 2%. During the regeneration it is suitable for the cells to be partially charged or discharged with a current with a maximum value of 25% of the nominal value of the capacity of the cell in ampere-hours. After the regeneration the regeneration solution is replaced by a new electrolyte. For alkaline cells it is advisable to repeatedly change the regeneration solution while rinsing it with distilled water if necessary.

Using these methods of regeneration it is not only possible to renew the capacity of a used battery to its original state, but also resurrect a battery that was no longer capable of being used due to the highly oxidized surfaces of the electrode plates.

After the long-term usage and monitoring of the results of this type of regeneration a demand arose for perfecting the regeneration in the sense of an increase in the capacity of the regenerated battery to extend its life.

At the current time the life of lead batteries is extended with a filling of sulfuric acid by inhibiting the creation of passive surface layers on the plates of the battery's electrodes. Many various agents that are added either to the electrolyte or to the material of the electrode as an anti-agglomeration material are used to this effect.

In the Czechoslovak Author's Certificate no. 260 591 the method of regenerating mechanically sound lead and alkaline battery cells is described. The regeneration is carried out by adding hydrogen peroxide to the electrolyte while the total added amount of hydrogen peroxide is in the range of from 0.01% to 3% of the capacity of the electrolyte cell and a 30% to 40% aqueous solution of hydrogen peroxide is used.

The advantage of this solution is that it partially eliminates irreversible sulfation, yet if an adequate amount is not provided the preparation operates very actively and can damage the separators between the electrodes and thus destroy the battery.

The additive for lead and alkaline batteries is described in the Czech Author's Certificate no. 271 813. The additive is created by a combination of compounds from which one is saccharides and their derivatives dissolved in water and the others are peroxide compounds.

Compared to the preparations mentioned above, this preparation represents a considerable improvement, increased effectiveness and a slowdown in the process which is particularly advantageous for starting batteries.

A disadvantage is that it does not solve the removal of the hardened layers of irreversible sulfatation from the surface of the battery's electrodes.

In the Czech patent no. 278 416 an additive to lead batteries with a sulfuric acid electrolyte is described. The additive contains sodium peroxoborate in the amount of 50% to 70% of the mass, sodium pyro diphosphate in the amount of 15% to 48% of the mass, bisodium dinaphtylmethane disulfonic acid salt in the amount of 1% to 15% of the mass and glycides or their epimers in the amount of 1% to 20% of the mass.

This regenerative agent was tested but did not prove successful. The aforementioned bisodium dinaphthylmethane disulfonic acid salt cannot be stored in an aqueous solution with an ingredient of peroxide and other compounds without the stabilization of the solution. Therefore this salt was only used in powder form. Its disadvantage is the instability during storage because bisodium dinaphthylmethane disulfonic acid salt with sodium peroxoborate and sodium pyrophosphate can react all by themselves, even at temperatures of more that 30° C., which degrades the regenerative agent. They also react very quickly inside the lead cell as well as in an undesirable way, while it may damage the separators between the battery's electrodes by its fast reaction.

The disadvantage of the regenerative agent in accordance with Czech patent no. 278 416 is that the preparation in the given composition reacts long and slowly and this preparation only oozes to the surface of the electrode material, especially with batteries whose electrodes are protected by textiles.

In Czech patent 292 524, commonly owned herewith, a regenerative agent for lead batteries is described that contains 1 ml to 70 ml of sulfuric acid with a density of 1.01 to 1.35 $g \cdot cm^{-3}$, 0.1 g to 10 g of saccharides and/or aldehydes or their derivatives in solids, 0.1 g to 10 g of sodium and/or calcium bicarbonate and/or at least one hydroxide from the hydroxides of alkaline metals in solid for each liter of aqueous solution 1% to 40% of hydrogen peroxide. It can further include agent contents from 10.1 g to 10 g sodium peroxoborate and/or sodium tetra borate and/or sodium pyrophosphate. This regenerative agent represents a considerable improvement compared to the previous solution. Its advantage is the smooth regeneration of the battery's electrodes.

It was ascertained with the two-year monitoring of the application of this regenerative agent according to Czech patent 292 524 also that in some cases, such as the very solid surface of the electrode plates, its effect is slow.

CS AO No. 186 387 described an utilization of the mixture, with a contain of minimally of 90% dinaphthylmethane disulfonate and 0.1 to 99.9% of sulphuric acid and dinatrium sulphate in mixture of arbitrary ratio, with maximum of 5% technological impurities. This mixture is added to the active mass and/or the electrolyte of new lead battery. According to this invention, this mixture has 2-3 times greater dispersing effect than beech powder or Kortan QD, and allows faster discharging during low temperature and increasing of service life of starting lead battery during classic cycling. This invention concerns only a production of the new batteries namely of starting battery working on low temperature and a treatment of electrolyte in the new batteries.

The said mixture does not contain hydrogen peroxide and further oxidizing or reducing agents as the saccharides and/or aldehydes, bicarbonates and/or hydroxides of alkaline metals or peroxoborate, tetraborate, sodium pyrophosphate. This mixture is not suitable for regeneration of the used batteries or cells and for an increasing of its capacity.

SUMMARY OF THE INVENTION

This objective resolves the method of the regeneration of lead battery cells with sulfuric acid electrolytes, during which the regenerative additive on the basis of aqueous hydrogen peroxide is added to the electrolyte, and after which at least one cell or storage battery is charged and discharged in the regular manner. The essence of this invention lies in the fact that at least one cell or storage battery being above the level of the full charge is formed by the cyclical charging and discharging over a total period of 10-70 hours, while at least one cell or storage battery is charged for a period of 15-20 minutes with a current of 1.1%-4% related to the value of the nominal capacity of the cell or storage battery and is discharged for a period of 0.5-2 minutes with a current of 0%-5% related to the nominal value of the capacity of the cell or storage battery.

The main advantage of this method is an increasing of capacity of the battery highly above its original nominal value and that with the chemically treated surface layer of the electrodes, with the help of peroxidic compounds on the basis of a hydrogen peroxide solution, various methods are possible to significantly restore the charging above the limit of the basic charging or below the limit of discharging and even improve it above the level attained during its creation. The method of electrochemical regeneration of lead storage batteries filled with a sulfuric acid electrolyte supplemented with a combination of the proposed recharging methods according to the invention increases the effect of regeneration more strikingly and enables the repeated restoration of. By extending the life of the cells or storage batteries the amount of dangerous waste is decreased which contributes to the improvement of the ecology.

Regeneration in accordance with this invention leads to a perfect surface change to the electrodes, to the softening of its surface, which increases the active functional area of the electrodes on which the size of the capacity of the cell or storage battery depends. For example, with an original battery with a manufacturer's specification of 120 Ah it is possible to increase its nominal value to up to 150 Ah after using the regeneration in accordance with this invention and its life can be extended up to two times. The advantage of regenerating in accordance with this invention is that it is possible to repeat it.

The cyclical charging and discharging in a defined time interval with a defined current deformation adjusts the quality of the electrolyte so that the conductive particles are transformed into non-conducting particles, which decreases the self-discharge of the cell or battery. The charging and discharging values are or chosen sparingly so that the electrodes are not damaged by, for example, distortion or deformation, because if the plates of the battery are hard, they are damaged at a higher current and its longer effect.

The bottom limit of the charging current is chosen so that electrochemical changes do not occur to the cells. The upper limit of the charging current is chosen in order that the cell or storage battery is not overheated during the charging. When using the regeneration additives and the cyclical overcharging of the cell or storage battery the "irreversible" surface sulfatation is effectively decomposed and dissolved.

A higher discharging current than charging current can be used because it acts for a considerably shorter time and its purpose is to lower the compressive voltage between the electrolyte and electrodes of the cells. Generally a zero value of the discharging current means the interruption of the charging during which the battery's voltage returns or approaches the open-circuit voltage.

The time intervals that the charging and discharging currents are in effect were designated on the basis of the optimal evaluation of experimental tests.

With an advantage at least one cell or storage battery being located above the level of full charge is formed by the cyclical charging and discharging during a total period of 10-70 hours, while at least one cell or storage battery is cyclically charged for a period of 15-20 minutes and discharged for a period of 0.5-2 minutes in two forming phases, with it being charged with a current of 1.1%-4% and discharged with a current of 0%-5%, related to the value of the nominal capacity of the cell or storage battery in the first phase, while in the second phase the current decreases during charging to 1.1%-3% and during discharging to 0%-4% related to the nominal value of the capacity of the cell or storage battery.

The advantage of this invention's method of regeneration, carried out in two phases is the further improvement of the capacity of the cell or storage battery. Two phases of forming the cell or storage battery allows for the utilization of higher charging and discharging currents in the first phase and lower currents in the second phase which is more beneficial for the battery. In the second phase with the lower current, for example, the softer structure of the surface of the electrodes is attained.

It is an advantage when at least one cell or storage battery is further charged with a constant current of 1.1%-2.1% related to the nominal value of the capacity of the cell or storage battery for a period of 20-50 hours.

It is also an advantage when between the first and second forming phases at least one cell or storage battery is partially discharged with a current of 10%-30% related to the nominal value of the capacity of the battery for a period of 2-10 minutes. It is possible to carry out the charging with a constant current of the aforementioned low values in the range of 1.1%-2.1% without damaging the surface of the battery, while the disintegration and dissolving of the undesirable lead sulfate takes place on the surface of the electrodes. Furthermore, during this process the release of atomic hydrogen occurs, from which the lead of the electrodes is purified.

It is also an advantage when at least one cell or storage battery is partially discharged with a current of 10% to 30% related to the nominal value of the capacity of the battery for a period of 2-10 minutes before the charging by a constant current. This discharging under defined conditions creates feedback of the capacity reflection in the battery and contributes to the eroding of the surface by hardened sulfatation.

It is also advantageous when, before its forming, at least one cell or storage battery is charged with a current of 5%-10% related to the value of the capacity of the battery until the cell or battery is fully charged, and this up to a value of 2.45 V per cell for acid cells. This charging is used for the case of hardened plates of stational storage batteries with wide-area electrodes. With this, when charging with a higher current without this modification, it can easily be deformed. In practice the frequent distortion and deformation of the hardened electrodes of the cell was witnessed on energy reserve storage batteries. These changes occurred after the discharging of the battery after a power failure with the subsequent charging by an assigned recharger which is usually set to the values of the given manufacturer. Electrodes hardened in this way are usually not functional any more and can not handle the regular current load without interruption.

An alternative solution is presented by the regeneration of lead battery cells located under the level of the permitted discharging (1.8 V for lead cells) during which the regeneration additive on the basis of aqueous hydrogen peroxide is added to the electrolyte. The essence of this alternative regeneration according to this inventions consists in the cell or the entire storage battery composed of the cells located under the level of the permitted discharging is formed by the cyclical charging and discharging during which it discharges for a period of 2-10 minutes with a current of 1% to 4% related to the value of the capacity of the battery and is subsequently charged for a period of 1-2 minutes with a current of 3%-10% related to the value of the capacity of the battery and this to a decrease in the voltage to 1.6 V for the cell or any of the battery's cells. Then the battery supplies 10%-15% of its nominal capacity. This entire procedure is repeated 2-5 times.

This alternative type of cyclical discharging and charging is suitable for cells for which the discharge limit is decreased to the limit of 1.6 V per cell for acid cells. In its result it has the same effects as forming a battery above the limit of the full recharged cell. This alternative regeneration method according to this invention requires the greater attention and monitoring of the measurement values.

The regeneration process according to this invention can be repeated in accordance with the battery operation demands.

The regeneration according to this invention is not suitable for the regular recharging of a battery, though it helps with the capacitive equalization of the battery cells with an advantage.

The method of charging according to the invention for regenerated batteries can be carried out advantageously with the help of peroxidic compounds created with the help of an aqueous solution of hydrogen peroxide specified, for example, in AO 260591, AO 263221, AO 262274, AO 271768, AO 271814 and AO 272401 so that the battery, after having the regeneration carried out and after the basic process of charging and discharging, preferably with a current with a size of at least 8% of the nominal value of the battery to the full indication of the charged cell or battery to a voltage of 2.45 V per cell for acid cells or batteries.

The aforementioned disadvantages of prior regenerative agents are eliminated or considerably restricted with the regenerative agent for lead batteries with an electrolyte of aqueous solution of sulfuric acid in accordance with this invention, whose essence lies in that the regenerative agent contains 1 to 70 ml of sulfuric acid with a density of 1 to 1.32 $g \cdot cm^{-3}$, 0.1 g to 10 g of saccharides in solids and/or aldehydes or their derivatives, 0.1 g to 10 g of sodium and/or potassium bicarbonate and/or at least one hydroxide from the group of alkali metal hydroxides in solids, or else a mixture containing 0.1 g to 10 g sodium peroxoborate and/or sodium tetraborate and/or sodium pyrophosphate and also containing 0.1 g to 20 g of bisodium dinaphthylmethane disulfonic acid salt in solids in each liter of aqueous solution 1% to 40% of hydrogen peroxide.

In an advantageous variation the regenerative agent contains 0.5 g to 2 g of bisodium dinaphthylmethane disulfonic acid salt in solids. The regenerative agent may contain 0.1 g to 5 g of a 10% to 50% aqueous solution of oxi-lignin and/or sulfite liquor.

The main advantage of new regenerative agent according to this invention is an increasing of capacity of the battery highly above its original nominal value together by using of new method of regenerating battery according to the submitted invention. An effect of regenerative agent is raised by the controlled repeating of charging and discharging in accordance with this invention. This new regenerative agent accelerates the process of regeneration. The significant improvement of regeneration in general and especially with especially-damaged lead batteries by hardened sulfation on the surface of the electrodes, while the regenerative agent contains a combination of bisodium dinaphthylmethane disulfonic acid salt in an acidic solution, it is chemically stable and no other components do not react in it in the presence of hydrogen peroxide.

Bisodium dinaphthylmethane disulfonic acid salt is always added in solid form to an acidic solution of hydrogen peroxide with sulfuric acid. While holding to these conditions the bisodium dinaphthylmethane disulfonic acid salt can be added in any order with the remaining components. The most suitable way to add this material is as the last component. It can eventually be added in a mixture of the solids of the other additives.

The defined amount of bisodium dinaphthylmethane disulfonic acid salt, even in the lower defined concentration, helps to dissolve the loose flakes and scales from the battery plates. This highly-effective material is suitable for station batteries.

Polymeric natural products of oxi-lignin derivatives or sulfite liquor, obtained, for example, as a waste product while processing wood, have a slower effect in comparison with bisodium dinaphthylmethane disulfonic acid salt, though they are more suitable for the regeneration of starting batteries with weak electrodes with a smaller thickness.

Hydrogen peroxide reacts with irreversible lead sulfides. Saccharides and/or aldehydes or their derivatives can be added either directly in the solid form of technically pure chemicals or, if it is advantageous, in a solution. Saccharides and/or aldehydes increase the effects of regeneration. Sodium and/or potassium bicarbonate and/or a hydroxide from the group of alkali metals, i.e. sodium hydroxide, potassium hydroxide and lithium hydroxide, represent the effective ingredient in the regenerative agent which significantly increases the quality of the regeneration process. These components can also be added in the solid form of technically pure chemicals or if it is suitable in its suitable solutions. The addition of sulfuric acid acts as a stabilizer of the regeneration solution and the solution would already begin reacting before being added to the battery without it.

Peroxoborate, tetraborate and sodium pyrophosphate increases the regeneration effect and slows and regulates the proceeding chemical reaction in the battery which prevents damage to the separators.

Peroxoborate, tetraborate and sodium pyrophosphate can also be added as solid materials, technically pure, or if it is appropriate in their suitable solutions.

A regenerative agent is specified for the purposes of easily adding it to the cells and it is composed of one liquid component, being from the aqueous solution of hydrogen peroxide and sulfuric acid in which the saccharides and/or aldehydes or their derivatives, the sodium and/or potassium bicarbonate and/or lithium hydroxide, and peroxoborate, tetraborate and sodium pyrophosphate are dissolved or reacted.

The regenerative agent is added to the battery's electrolyte either as a concentrate or diluted in accordance with the intention of the regeneration. For example, during the operations of the battery it is suitable to add a diluted regenerative agent, maybe even repeatedly, of course in the framework of the lower concentration of the scope of claims of invention. Concentrated solutions are added for the fast implementation of regeneration after which it is possible to form the regenerated battery.

For safe storage and longer longevity a regenerative agent is specified, consisting of two components, being an aqueous solution of hydrogen peroxide and sulfuric acid and a solid component made up of saccharides and/or aldehydes or their derivatives, sodium and/or potassium bicarbonate and/or lithium hydroxide, and peroxoborate, tetraborate and sodium pyrophosphate.

EXAMPLES OF IMPLEMENTING THE INVENTION

Example 1

An OPzS 160 traction battery with a nominal voltage of 48V and a nominal capacity (Cn) of 240 Ah which was used for 6 years in non-standard operations showed an overall decreased capacity of about 20% Cn.

This battery was regenerated with the regenerative agent in accordance with Czech patent 292 524 so, the regenerative agent was added in two phases at first 30 ml and then 40 ml to the first half of the cells after the modification of the electrolyte with an interval of 15 minutes.

After the calming of the chemical reaction in about 20 minutes this first half of the cells of battery was charged with a current of 30 A until the beginning of the release of gasses and then recharged with a forming current of 5 A for a period of 60 hours by routine way. Ninety-two percent of the nominal value was attained.

This regenerative agent was prepared from one liter of 35% aqueous solution of hydrogen peroxide, into which 70 ml of sulfuric acid with a density of 1.28 $g \cdot cm^{-3}$ is added, followed by one ml of 30% aqueous solution of formaldehyde and 2 g of technically pure sodium hydroxide and/or potassium hydroxide. The regeneration solution was mixed and after mixing was prepared for use.

The second half of the battery cells was regenerated with the regenerative agent, having the same composition as in the previous example, with the difference that the regenerative agent contained an additional 2 g of bisodium dinaphthylmethane disulfonic acid salt per liter. The regeneration process was the same as in the first half of the cells of this battery, though the nominal capacity attained was 112%.

This second half of the cells was further regenerated according to this submitted invention in the following manner:

This second half of the cells was further regenerated according to this invention in the following manner:

The second half of the storage battery cells were repeatedly charged and formed according to this invention so that it was at first charged to the full charge mark with a current of 11 A for a period of 15 hours. It was subsequently alternately charged and discharged according to this invention so that after 20 minutes of charging with a current of 5 A (3.125% related to the nominal capacity of the battery) it was always discharged for 1 minute with a current of 6 A (3.75% related to the nominal capacity of the battery) and this entire process of charging and discharging was repeated for a period of 20 hours. Then the battery was further charged so that after 20 minutes of charging with a current of 3 A (1.87% related to the nominal capacity of the battery) it was always discharged for 2 minutes with a current of 4 A (2.5% related to the nominal capacity of the battery) for a period of an additional 24 hours.

The result was an increase of the battery's capacity to 132% of its nominal capacity value.

Example 2

A preparation for a lead battery is prepared so that first 60 ml of sulfuric acid with a density of 1.24 g·cm$^{-3}$ is added to one liter of 30% aqueous solution of hydrogen peroxide. Then 10 g of saccharides are added to the resulting solution, i.e., in the form of technically pure glucose, and also 1 g of technically pure sodium bicarbonate and 2 g of bisodium dinaphthylmethane disulfonic acid salt. The combination is mixed until all of the ingredients have dissolved, at which point the regenerative agent is ready to be used.

A traction storage battery used 5 years with a nominal voltage of 24 V and a nominal capacity of 400 Ah with a decreased capacity below about 30% Cn was regenerated with the regenerative agent in accordance with this invention. The preparation was added to each of the cells in two phases in 10-minute intervals after the adjustment of the levels of the electrolyte in the battery cells. In each phase 80 ml of the regenerative agent was added. After the calming of the chemical reaction in about 20 minutes the battery was charged with a current of 50 A until the beginning of the release of gasses. Then the battery was formed by recharging with a current of 8 A for a period of 60 hours. The result of the regeneration was a capacity equalization of the battery cells with a capacity of 102% Cn reached after the regeneration.

After the capacity test this battery was further regenerated in accordance with the submitted invention by charging and discharging by the level of the standard discharging so that it was discharged with a current of 5 A (1.25% related to the nominal capacity of the battery) so that after each 10 minutes it was charged for 2 minutes with a current of 16 A (4.0% related to the nominal capacity of the battery) to a decrease in the voltage to 1.6 V in the weakest cell. It was possible to follow this process for about 30 minutes. Then the battery was given a charge of 10% capacity and the process of discharging and charging was repeated 3×. Then the battery was charged with a current of 16 A to the full charging mark and discharged with a current of 48 A (12% related to the nominal capacity of the battery) for ten minutes and repeatedly recharged with a constant current of 3 A for a period of 18 hours.

During the measuring of the capacity test a capacity increase of 118% was detected.

Example 3

An OPzS traction storage battery with a nominal voltage of 12 V and a nominal capacity of 280 Ah was put into operation 8 years ago for a period of 12 months and then was stored without the electrolyte which was poured out of it. Due to the long storage the electrode plates were impaired with a coating of irreversible sulfatation forming on them.

After 4 years this battery was regenerated with the following regenerative agent made with 10 g of technically pure sodium bicarbonate, 70 ml of sulfuric acid with a density of 1.28 g·cm$^{-3}$, 5 g of saccharides in the form of solid glucose and 5 g of technically pure sodium tetraborate added to 1 liter of 30% aqueous solution of hydrogen peroxide. The sodium tetraborate can be fully or partially replaced by diphosphate or sodium peroxoborate. Finally, 3 g of bisodium dinaphthylmethane disulfonic acid salt was added.

This battery was stored for 8 years in a non-standard environment and its electrodes were heavily oxidized. After the repeated dosage of the regenerative agent and after charging by routine way a capacity of 102% Cn was reached with it.

This storage battery was regenerated in accordance with the submitted invention in two phases. In the first phase it was charged with a constant current in the magnitude of 4.5 A (1.6% related to the nominal capacity of the battery). For the recharging a recharger from the Czech company Condata was used with a special recharging with a negative impulse for a period of 20 hours in which the first phase of regeneration according to the submitted invention is completed. Before the further recharging in the second phase the battery was discharged with a current of 50 A (17.85% related to the nominal capacity of the battery). In the second recharging phase the battery was alternately charged and discharged according to this invention so that after 20 minutes of charging with a current of 8 A (2.85% related to the nominal capacity of the battery) it was always discharged for 1 minute with a current of 12 A (4.28% related to the nominal capacity of the battery) while this entire cycle of charging and discharging lasted 24 hours. After the charging was stopped a capacity test was carried out which showed the capacity of the battery at a level of 120% Cn.

Example 4

In the previous examples the regenerative agent specified was single-component in the form of an aqueous solution of hydrogen peroxide and sulfuric acid in which the other components had dissolved or reacted.

In this example the regenerative agent specified is binary with one component being liquid, the other solid.

The liquid component consists of an aqueous solution of hydrogen peroxide and sulfuric acid where 93% to 99% being aqueous hydrogen peroxide with a concentration of 1% to 40% and 1% to 7% being sulfuric acid with a concentration of 1 to 1.32 g·cm$^{-3}$.

The solid component consists of 20% to 60% solid saccharides and/or aldehyde or their derivatives, 15% to 50% by weight solid sodium bicarbonate and/or potassium carbonate or lithium carbonate and 20% to 60% by weight solid sodium peroxoborate and/or sodium tetraborate and/or sodium diphosphate. The first component also contains 0.3 g-10 g of a 10% to 50% aqueous solution of derivates of oxi-lignin and/or sulfite liquor.

First the solid component is added to the battery. For each liter of the battery electrolyte 0.3 g to 15 g of a fixed component is added. Then 30 ml to 70 ml of the liquid component is added to each liter of the battery electrolyte in two consecutive batches, creating the regenerative agent directly in the electrolyte.

Within 15 to 20 minutes a chemical reaction takes place in the battery after which the battery starts to charge with, for example, a current of 0.1 Cn. When gas begins to be released in the battery after the charging, the final charging of the battery is implemented by routine way with a forming current of 0.01 to 0.02 Cn, i.e. 1% to 2% of the value of its nominal capacity.

This type of regenerative agent is suitable for all types of lead batteries with sulfuric acid-filled electrolytes.

In a concrete example the regenerative agent specified was applied to a J2-72 Ah-24 V station battery with a decreased capacity of 35% of its nominal value so that 12 g of solid regeneration component in powder form, made by mixing 30 g of technically clear glucose, 15 g of sodium bicarbonate and 55 g of sodium peroxoborate, was added to each cell of the battery. After about 10 minutes had passed 15 ml of 35% aqueous solution of hydrogen peroxide was added to each cell stabilized by sulfuric acid i.e. 5 ml of sulfuric acid with a density of 1.28 g·cm$^{-3}$ for each liter of 35% aqueous solution of hydrogen peroxide. Then the storage battery was repeatedly charged and discharged and was formed in the end with a forming current. During a capacity test the battery tested showed a capacity of 106% its nominal value.

This battery was further regenerated in the manner according to this submitted invention as follows. The storage battery was charged with a current of 5.7 A (8% related to the nominal capacity of the battery) until the state of the beginning of the electrodes' intensive releasing of gasses. Then the storage battery was momentarily discharged with a current of 10.8 A (15% related to the nominal capacity of the battery) for a period of 7 minutes. Subsequently the storage battery was recharged in two phases with a constant current of 1.3 A (1.8% related to the nominal capacity of the battery) for a period of 20 hours. Then the battery was shut off for a period of 10 minutes.

In the next phase the battery was recharged with a constant current of 1.5 A (1.5% related to the nominal capacity of the battery) for a period of an additional 40 hours.

The final overall capacity of the battery was 114% of its nominal capacity value.

Example 5

The regenerative agent is used in accordance to this invention with example 1 with the difference that the aqueous solution of hydrogen peroxide will be 1%-10%. This regenerative agent is suitable for the gradual regeneration during the operation of the battery. Instead of the regular topping-up of the evaporated electrolyte with distilled water this regenerative agent is poured into the battery as needed.

In a concrete example the regenerative agent is prepared for lead batteries so that 60 ml of sulfuric acid with a density of 1.28 g·cm$^{-3}$ is added to 1 liter of 10% aqueous solution of hydrogen peroxide. 5 g of saccharides, i.e., in the form of technically pure glucose, are added to the resulting solution as is 1 g of technically pure sodium bicarbonate. Finally, 2 g of bisodium dinaphthylmethane disulfonic acid salt is added.

The compound is mixed whereby the regenerative agent is ready to be used.

This regenerative agent was used in a lead battery in that after the warranty period of the starting battery 55 Ah-12V had expired the regenerative agent was regularly poured into it over its entire lifetime instead of distilled water. The storage battery in question was used for more than 5 years after the warranty period with good starting capabilities even in low temperatures under minus 20° C.

This example demonstrates the regenerative agent used in operations for a starting battery. If it would have been necessary to increase the capacity of such a battery, it is essential to disconnect it from operations for the regeneration and to proceed with the regeneration method in accordance with this invention. In this case the closest regeneration would be, for example, according to example 1, though with about a third of the current levels while maintaining the same charging and discharging periods.

The aforementioned concrete examples are not comprehensive and other combinations are possible in the framework of idea and extent of the demands on the protection of this technical solution.

INDUSTRIAL APPLICABILITY

The method of regenerating lead battery cells with a sulfuric acid electrolyte is suitable for both the industrial areas of station, lighting, traction and starting storage batteries as well as for personal use for the purpose of the further extension of the life of the cells or the entire batteries.

The claimed regenerative agent is suitable for all types of lead batteries with a sulfuric acid filling.

The invention claimed is:

1. A regenerative composition for regenerating lead batteries with a sulfuric acid electrolyte, containing for 1 liter of aqueous solution 1% to 40% hydrogen peroxide, 1 ml to 70 ml of sulfuric acid with a density of 1 to 1.32 g·cm$^{-3}$, 0.1 g to 10 g of saccharides in solids and/or aldehydes or their derivates, 0.1 g to 10 g of sodium and/or potassium bicarbonate and/or at least one hydroxide from the group of alkali metal hydroxides in solids, and 0.1 g to 20 g of bisodium dinaphthylmethane disulfonic acid salt.

2. The regenerative agent according to claim 1, containing 0.5 g to 2 g of bisodium dinaphthylmethane disulfonic acid salt.

3. The regenerative agent according to claim 1, containing 0.1 g to 5 g of 10% to 50% aqueous solution of derivates oxi-lignin and/or sulfite liquor.

4. The regenerative agent according to claim 1, further including 0.1 to 10 g of at least one of sodium peroxoborate, sodium tetraborate and sodium pyrophosphate.

5. The regenerative agent according to claim 1, containing in 1 liter of aqueous solution 30% hydrogen peroxide, 70 ml of sulfuric acid having a density of 1.28 g·cm$^{-3}$, 5 g solid glucose, 10 g sodium bicarbonate; 3 g bisodium dinaphthylmethane disulfonic acid salt, and 5 g sodium tetraborate.

* * * * *